(12) United States Patent
Post

(10) Patent No.: US 8,588,070 B2
(45) Date of Patent: Nov. 19, 2013

(54) METHOD FOR SCHEDULING PACKETS OF A PLURALITY OF FLOWS AND SYSTEM FOR CARRYING OUT THE METHOD

(75) Inventor: Georg Post, La Ville du Bois (FR)

(73) Assignee: Alcatel Lucent, Paris (FR)

( * ) Notice: Subject to any disclaimer, the term of this patent is extended or adjusted under 35 U.S.C. 154(b) by 383 days.

(21) Appl. No.: 12/588,029

(22) Filed: Oct. 1, 2009

(65) Prior Publication Data

US 2010/0124234 A1   May 20, 2010

(30) Foreign Application Priority Data

Nov. 18, 2008  (EP) .................................... 08 305812

(51) Int. Cl.
*H04L 12/54* (2013.01)

(52) U.S. Cl.
USPC ......... 370/235; 370/395.72; 370/412; 710/56

(58) Field of Classification Search
None
See application file for complete search history.

(56) References Cited

U.S. PATENT DOCUMENTS

| 6,034,945 | A  | * | 3/2000  | Hughes et al. | ............... | 370/230 |
| 6,469,982 | B1 | * | 10/2002 | Henrion et al. | .............. | 370/230 |
| 6,515,693 | B1 | * | 2/2003  | Haas et al. | .................... | 347/236 |
| 6,643,617 | B1 |   | 11/2003 | Wood et al. |
| 7,483,677 | B2 | * | 1/2009  | Zechlin et al. | ................. | 455/73  |
| 2002/0036984 | A1 | * | 3/2002 | Chiussi et al. | ................ | 370/232 |
| 2004/0218592 | A1 |   | 11/2004 | Nagar et al. |
| 2005/0175014 | A1 | * | 8/2005 | Patrick | ..................... | 370/395.43 |
| 2005/0195740 | A1 | * | 9/2005 | Kwon | ........................... | 370/229 |

FOREIGN PATENT DOCUMENTS

EP   1 028 600   8/2005

OTHER PUBLICATIONS

Search Report for corresponding European Application No. 08 305 812.3 dated Mar. 28, 2011.
Rong Pan et al., "Approximate Fiarness through Differential Dropping" ACM SIGCOMM Computer Communications Review, Apr. 2003, XP-002514788, URL: http://delivery.acm.org/10.1145/960000/956985/p23-pan.pdf?key1=956985&key2=9767344321&coll=GUIDE&dl=GUIDE&CFID=21465839&CFTOKEN=58296384> retrieved Feb. 10, 2009.

* cited by examiner

Primary Examiner — Brian Roberts
(74) Attorney, Agent, or Firm — Harness, Dickey & Pierce

(57) ABSTRACT

The invention concerns a method for scheduling packets belonging to a plurality of flows received at a router. It is also provided the system for carrying out the method. According to the invention, a single packet queue is used for storing said packets, said single packet queue being adapted to be divided into a variable number of successive sections which are created and updated dynamically as a function of each received packet, each section being of variable size and a section load threshold for each flow of said plurality of flows being allocated to each section. The method further comprises insertion (S11; S22; S210; S222; S230) of each received packet of a given flow in one of said successive sections as a function of said given flow and of the corresponding section load threshold.

16 Claims, 6 Drawing Sheets

METHOD FOR SCHEDULING PACKETS OF A PLURALITY OF FLOWS AND SYSTEM FOR CARRYING OUT THE METHOD

The invention relates generally to flow processing in a router of a packet oriented network, in particular to a method for scheduling packets belonging to a plurality of flows received at a router and the scheduling system for carrying out the method.

Multiplexed packet streams transmitted through a packet oriented network, such as the public Internet network or private Ethernet network currently consist in a plurality of packets belonging to a plurality of different flows. Information, such as source and destination address included in each packet, enable the processing nodes and the routers, present in the packet oriented network, to determine the flow to which a packet belongs. Thus, all packets in a given flow are processed in the same manner by the processing nodes and routers.

According to the application to which they relate, flows are classified in different QoS (Quality of Service) categories. For instance, flows related to audio-video applications are classified in streaming which needs a highest grade of QoS than flows related to classical data transfer applications.

On a specific router, global bandwidth available at the egress side may be inferior to the bandwidth necessary to transmit all the packets of all the different flows incoming at the router. In such a congested situation, packets of the different flows are stored in packet queues within the router until the available egress bandwidth enables their forwarding. In order to insure that flows of the same category are equally represented at the egress side of the router (i.e. approximately the same amount of data is extracted from the different packets queues for all the flows of the same category in order to be transmitted) and in order to avoid that all the packets of a given flow, once stored, have fewer chances to get extracted as compared to packets of other flows of the same category, fair scheduling methods are used.

In traditional WFQ (Weighted Fair Queuing), the scheduling of received packets is determined according to a virtual time information stamped on the packet when received at the router. Each flow is associated to a fair share of bandwidth which is used to compute the difference between time information stamped on successive packets belonging to the same flow. When a packet is to be sent, the scheduler searches among all buffered packets for the one with the lowest time stamp.

Fair scheduling has different effects on two categories of flows. Packets belonging to a flow with an arrival throughput greater than a fair throughput available at the egress side of the router, are buffered in packet queues to slow down the service of the flow to the fair throughput. Flows with arrival throughput inferior to the fair throughput pass through the router with a minimal delay.

However, determination of the virtual time of each packet of each flow comprised in the multiplex packet stream passing through the router which is calculated as a function of the number of enqueued flows passing through the router at a given time (for example, if ten different flows arrive at the router, fair throughput may be the total bandwidth available at the egress side of the router divided by ten), needs complex computation circuitry to be implemented in the router. Moreover, the complexity of the search for the packet with lowest virtual time is in the order of log(n), where n is the number of flows passing through the router. Consequently, such a complexity may appear as a limitation in the sense that it will be difficult to implement this method in routers receiving a large number of flows.

Another solution currently used to enable a fair queuing performs a scheduling according to a DRR (Deficit Round Robin) algorithm. DRR algorithm processes the different flows in a cyclic way, according to the well known principle of "Round Robin". More precisely, in order to perform a DRR based scheduling, a router is provided with a plurality of packet queues. Each queue of the plurality of packet queues is assigned to a given flow and can temporarily store packets of the given flow when the available bandwidth at the egress side of the router is insufficient to immediately send the packet once it is received by the router.

For each of the packet queues, the extraction of packets to be forwarded by the router is performed cyclically. Each queue is authorized to extract, at each cycle, a number of packets up to a quota, the quota being a predetermined number of packets or a predetermined amount of bytes. Furthermore, the quotas may be different for each of the queues.

One of the main advantages of this method is that the complexity of its implementation does not depend on the number of flows which transit across the router.

However, to avoid that a large number of cycles be necessary to get rid of all the packets stored in the different packet queues, quotas are currently set to a high value. Consequently, for each packet queue, a large number of packets may be extracted at each cycle, causing a burst of packets of a single flow in the multiplexed packet stream forwarded by the router. In other words, the distribution of packets of the forwarded packet stream is no more uniform in the sense that it contains long sequences of following packets which belong to the same flow.

Burst events, which break the uniformity of the multiplexed packet stream, should be, whenever possible, avoided during transmission. Indeed, many packet processing elements currently used in packet network, such as global switch cards or deep packet inspection nodes, are not able to function properly when the multiplex packet stream presents such a non-uniform distribution of packets since the time interval between two successive packets of the same flow becomes too small.

In view of the above, none of the traditional Weight Fair Queuing or Deficit Round Robin method is completely satisfactory for use in a router since the former has a complexity which increases with the number of flows to be treated and the latter creates "burst" events at the egress side of the router.

The aim of the present invention is a simple and efficient scheduler of packets belonging to different flows by scheduling the packets in a fair way, while keeping the complexity of the circuitry independent from the number of flows to be treated and avoiding the accumulation of bursts. Another aim is to store a minimal amount of information per flow, such that a router can easily share its bandwidth among tens of thousands of flows, for example.

To this end, a first object of the invention is a method for scheduling packets belonging to a plurality of flows received at a router, said method being characterized in that a single packet queue is used for storing said packets, said single packet queue being adapted to be divided into a variable number of successive sections which are created and updated dynamically as a function of each received packet, each section being of variable size and a section load threshold for each flow of said plurality of flows being allocated to each section, and in that each received packet of a given flow is stored in one of said successive sections as a function of said given flow and of the section load threshold for said given flow.

According to one preferred embodiment, storing a received packet of a given flow comprises the following steps:

a) if the single packet queue is empty, creating a first section and storing the received packet in said first section;
b) if the single packet queue is not empty:
   b1) checking whether the single packet queue has an existing section which already stores the last received packet belonging to said given flow;
   b2) if no existing section has been identified at step b1), storing the received packet in said first section;
   b3) if an existing section has been identified a step b1):
      b31) either storing the received packet in the existing section if an amount of data currently stored in the existing section for the given flow is less than the section load threshold for the given flow; or
      b32) if the existing section is the last section created within the single packet queue, creating a new section which immediately follows the existing section, and storing the received packet in the new section;
      b33) if the existing section is not the last section created within the single packet queue, storing the received packet in the section which immediately follows the existing section.

In addition, it is possible, according to the method of the invention, to identify a particular section among the successive sections which corresponds to the oldest section created within the single packet queue currently storing at least one packet and extract sequentially a number of packets from the single packet queue, wherein the first packet to be extracted is the first packet stored in said particular section.

Advantageously, the particular section is identified through the use of a forwarding pointer which points to the storage address, in said packet queue, of the first packet of said particular section.

Furthermore, in one embodiment, the method according to the invention may comprise the step of deleting the particular section after all packets of said particular section have been extracted.

In addition, it is possible, according to a preferred embodiment, to identify the last section in the single packet queue and to drop packets from said last section, in order to prevent an overflow of the queue.

A second object of the invention is a scheduling system for carrying out the method disclosed in the first object. The system is characterized in that is comprises:
   a single queue defined for storing said packets, said packet queue being adapted to be divided into a variable number of successive sections which are adapted to be created and updated dynamically as a function of a received packet, each section being of variable size;
   means for allocating, to each section, a section load threshold to each flow of said plurality of flows.

The features and advantages of the invention will become more apparent from the following detailed description with reference to the attached figures wherein.

Figure 1:
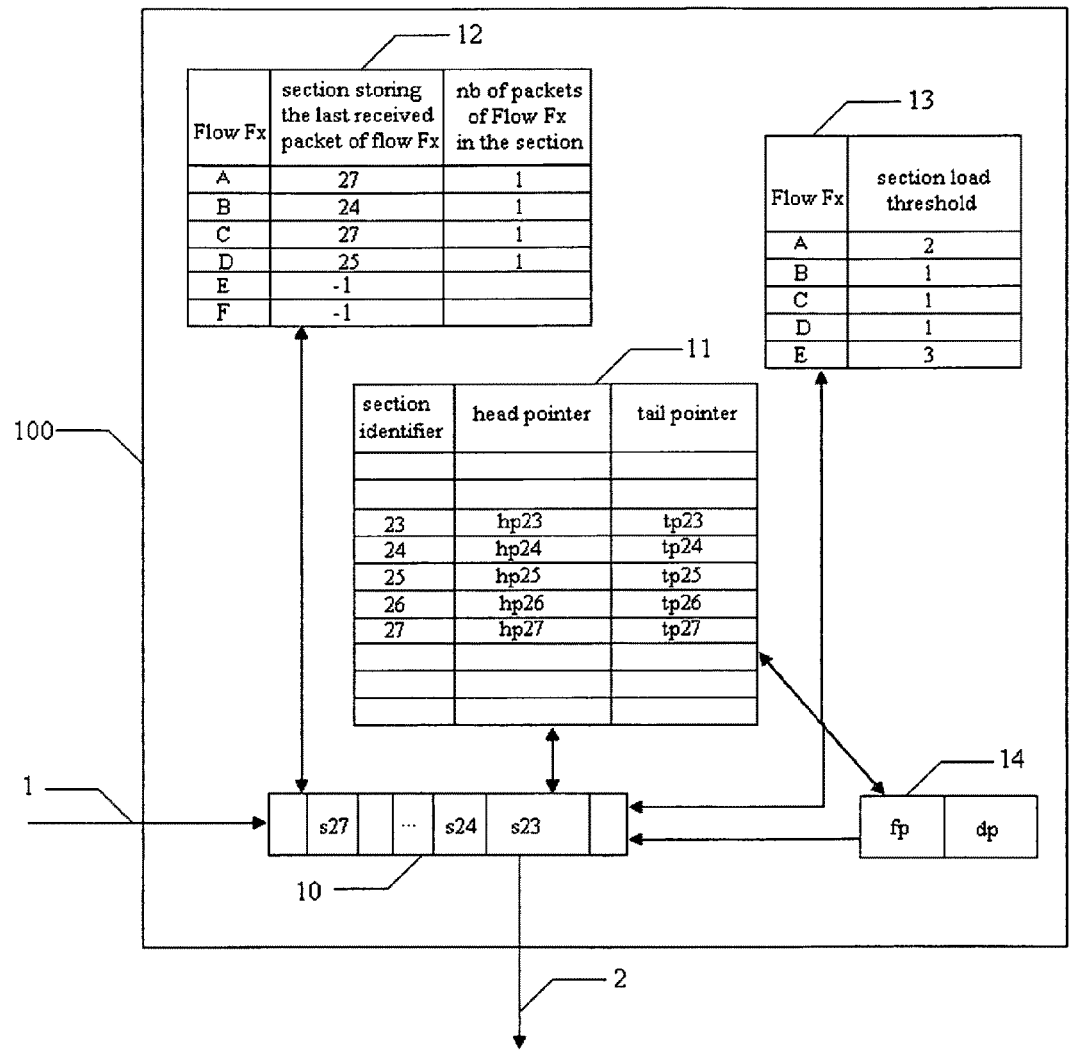
FIG. 1 represents schematically a specific preferred architecture of different elements (implemented as stored data in memories) and their interaction for scheduling packets of different flows received at a router according to the method of the invention.

As shown on FIG. 1, a multiplex packet stream 1 is received at the ingress side of router 100. Such a multiplex packet stream 1 is composed of packets belonging to different flows which have been multiplexed together. Although one multiplex packet stream is represented at the ingress side of the router, packets of different flows may also be received via different access interfaces.

As already explained above, the global bandwidth available at egress side 2 of router 100 may be inferior to the bandwidth required to transmit all the packets of all the different flows incoming at router 100. In such a congested situation, packets of the different flows must be stored and transmitted according to a fair scheduling process whenever possible (i.e. when sufficient bandwidth is available at the egress side). Moreover, in severe congestion, an overflow of the packet storage buffer must be prevented by dropping appropriate packets. The method according to the invention performs better than the conventional drop-tail, which discards just the last arrived packet.

As shown on FIG. 1, the method according to the invention differs from the current DRR scheduling method as previously described, in that a single packet queue 10 is used for storing the packets of all the different flows. Single packet queue 10 is adapted to be divided into a variable number of successive sections s1, s2, . . . , sN which are created, updated or deleted dynamically as a function of each received packet. In addition, each section s1, s2, . . . , sN is of variable size and a section load threshold for each flow incoming at ingress side of router 100 is allocated to each section s1, s2, . . . , sN.

When a packet of a flow is received at router 100, it is stored in one of the successive sections s1, s2, . . . , sN according to the flow to which the packet belongs and the allocated section load threshold for this flow.

The successive sections si currently storing at least one packet, form a global chained list. Each stored packet is a link of the global chained list. New section can be dynamically created and added to the chained list. Packets will then be extracted sequentially from the packet queue 10 according to their order in the global chained list. When all the packets of a section have been extracted, the section is deleted from the chained list.

Figure 2:
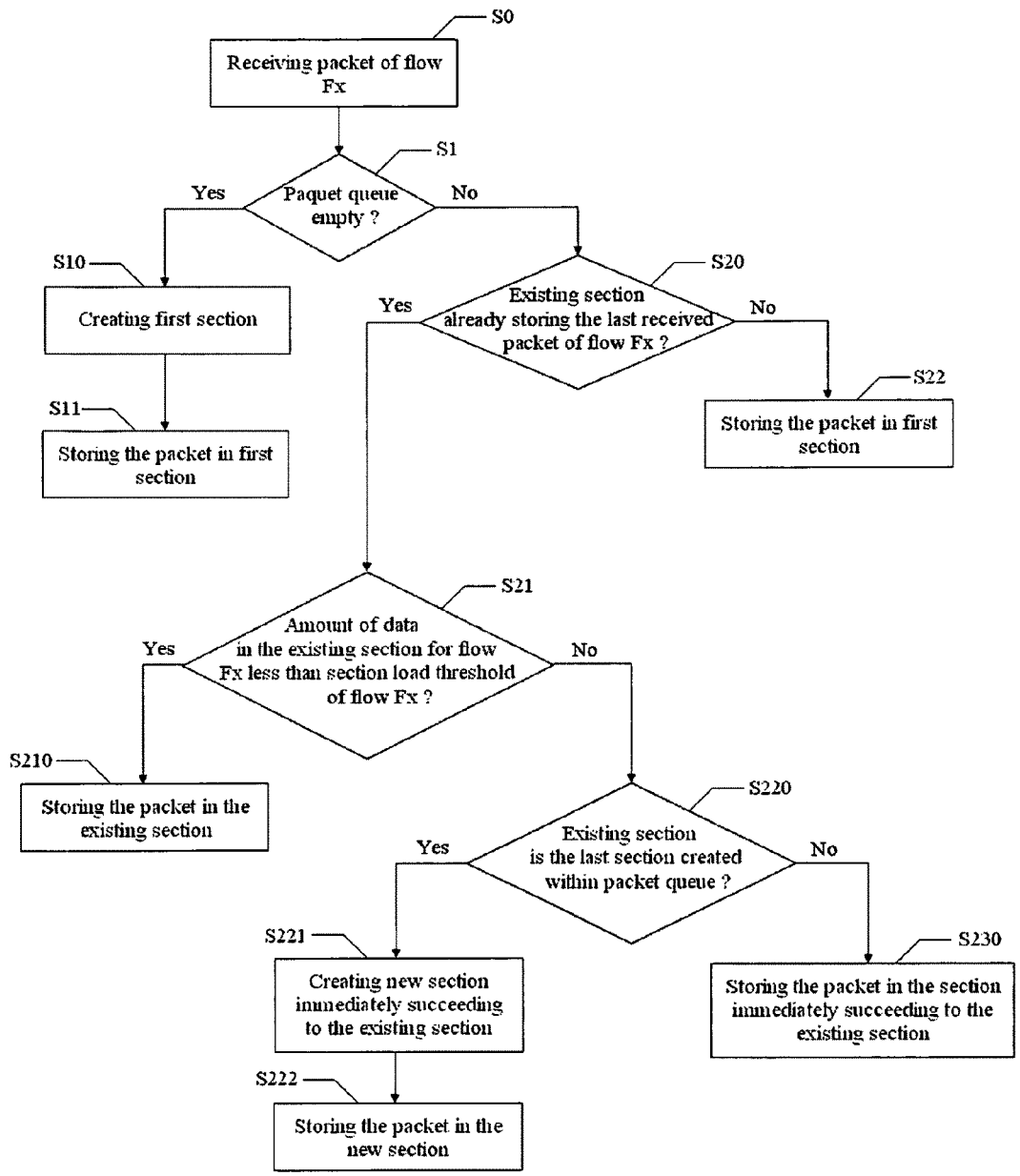
FIG. 2 shows a schematic diagram representing the different steps of the method according to a preferred embodiment of the invention for storing a received packet of a given flow in the single packet queue.

As shown on FIG. 2, when a new packet of a given flow FX is received at router 100 (Step S0 on FIG. 2), it is checked, according to the method of the invention, whether single packet queue 10 is empty (Step S1 on FIG. 2). Packet queue 10 may be empty if, for example, all the packets previously stored in packet queue 10 have been already been extracted to be transmitted before the reception of a current packet. If packet queue 10 is empty, a first section is created within said packet queue 10 (Step S10 on FIG. 2), and the received packet is stored in this first section (Step S11 on FIG. 2).

Conversely, if single packet queue 10 is not empty (i.e. at least one packet is currently stored in packet queue 10 when a new packet is received), it is then checked, according to the method of the invention, whether single packet queue 10 comprises an existing section which already stores the last received packet belonging to the same given flow FX (Step S20 on FIG. 2).

When no existing section has been identified, the new received packet is stored in the first section (Step S22 on FIG. 2).

Alternatively, when such an existing section has been identified, comparison is performed between the amount of data currently stored in the identified existing section for the given flow FX with the section load threshold allocated for this flow (Step S21 on FIG. 2).

Then, if the amount of data currently stored is less than the section load threshold, the received packet is stored in the identified existing section (Step S210 on FIG. 2). If it not the case, it is checked whether the identified existing section is the last section created within packet queue 10 (Step S220 on FIG. 2).

If the existing section is the last section created within packet queue 10, a new section which immediately follows the existing section is created (Step S221 on FIG. 2), and the received packet is stored in the new created section (Step S222 on FIG. 2).

On the other hand, if the existing section is not the last section created within packet queue 10, the received packet is stored in the section which immediately follows the existing section (Step S230 on FIG. 2).

Referring to FIGS. 1, 2, 3a and 3b, the various features involved in the scheduling of the received packets and the various steps implemented for creating and updating a section in packet queue and inserting a received packet in packet queue 10 will be detailed.

Figure 3A:
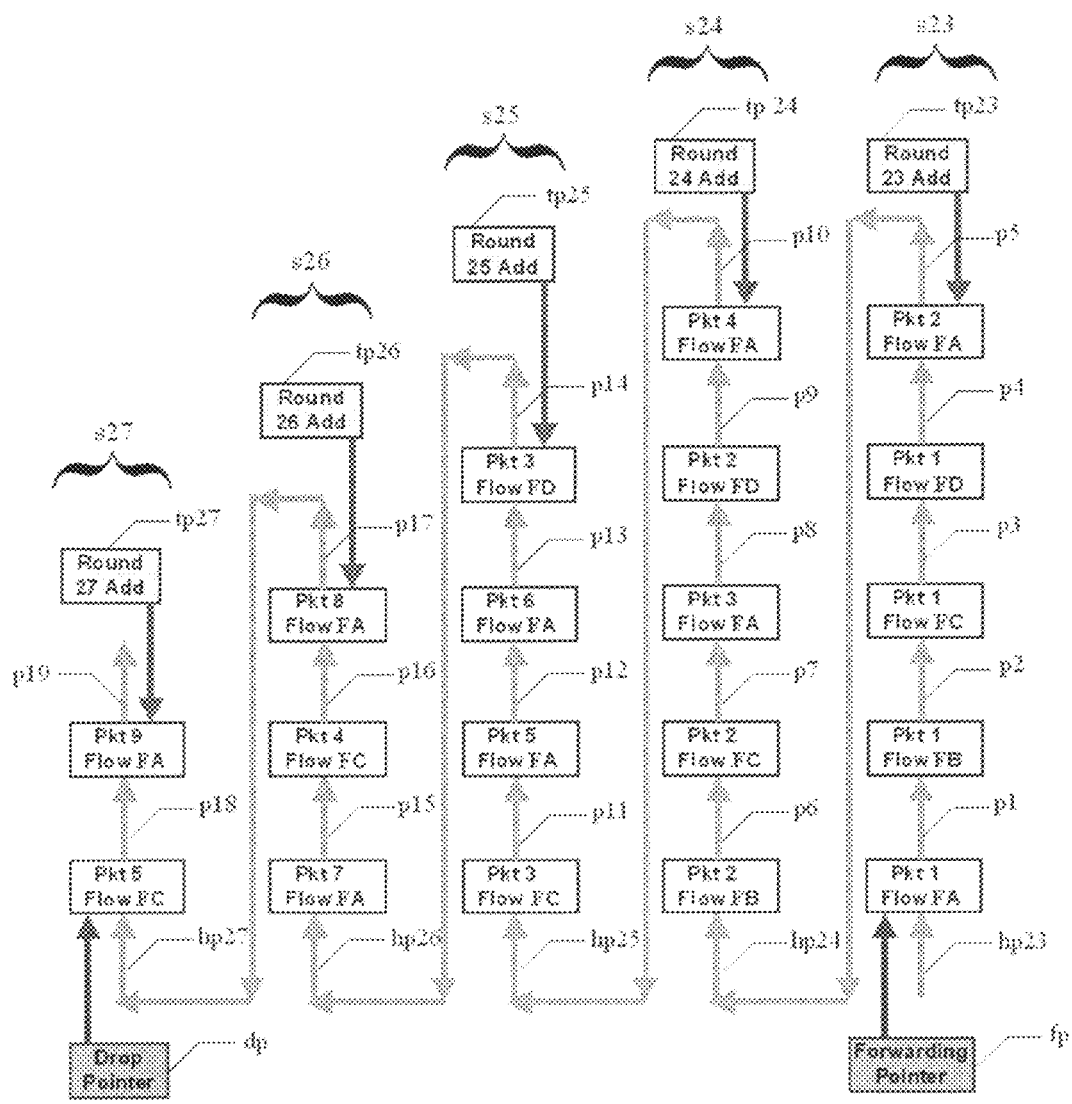
FIGS. 3a and 3b represent schematically an example of successive sections of a packet queue which are currently storing received packet, the received packet having been inserted in the section according to the method of the invention.

FIG. 3a represents the state of packet queue 10 at a given instant when successive sections s23, s24, s25, s26 and s27 are currently storing packets. It is assumed that sections s1 to s22 have previously been filled with received packets. In addition, all packets previously stored in sections s1 to s22 have already been extracted, and consequently, as already quoted above, these sections have been deleted. (Extraction of packets and deletion section according to the method of the invention will be described in detail in a second step). Consequently, in this example, section s23 of packet queue 10 is the first section of the queue currently existing.

As shown on FIG. 3a, packets of respective flows FA, FB, FC and FD are currently stored in packet queue 10. For the purpose of clearly illustrating the method according to the invention, each packet shown on FIG. 3a is given with a packet number. These packet numbers allows to know in which order the different packets of a given flow FX have been received at router 100. For instance, packet of flow FA numbered Pkt 1 has been received before packet of flow FA numbered Pkt 2.

However, as illustrated later on, the packet of flow FA numbered Pkt 2 may have been received after the packet of flow B numbered Pkt 2 even if the packet of flow FA numbered Pkt 2 is currently stored in section s23 and the packet of flow FB numbered Pkt 2 is currently stored section s24.

In addition, according to the invention, all the buffered packets form a single linked list. Each packet stored in a given section is associated with a pointer pi which indicates the address in packet queue 10 where the next packet of the given section is stored. If the packet is the last packet of given section and if the given section is the last created section within packet queue 10, the associated pointer is equal to the NULL pointer. Thus, pointer p19 associated to packet of flow FA numbered Pkt 9 stored in section s27 is equal to the NULL pointer.

Alternatively, if the packet is the last packet of a given section and if the given section is not the last created section within packet queue 10, the associated pointer indicates the address of the first packet stored within the section which immediately follows the given section. Accordingly, as an example, pointer p5 associated with the last packet of section s23 indicates the storage address of the packet of flow FB numbered Pkt 2 which is the first packet of section s24.

According to the method of the invention and as shown on FIG. 2a, the successive sections are ordered according to a section identifier. Furthermore, each section si is preferably identified by a head pointer hpi. These head pointers hpi respectively indicate the address of storage, in packet queue 10, of the first packet respectively stored in section si. For instance, head pointer hp23 points to the storage address in packet queue 10 of the packet of flow FA numbered Pkt 1. Head pointer hp27 points to the storage address of packet of flow FC numbered Pkt 5 which is the first packet stored in section s27.

Each section si is also identified by a tail pointer tpi which respectively indicates the storage address, in packet queue 10, of the last packet respectively stored in section si. For instance, tail pointer tp24 points to the storage address of the packet of flow FA numbered Pkt 4 and pointer tp25 points to the storage address of the packet of flow FD numbered Pkt 3.

In case section si only comprises one packet, head pointer hpi and tail pointer tpi have the same value in the sense that they point to the same address which corresponds to the storage address of the unique packet of section si.

Advantageously, the section identifier, the head pointer hpi and the tail pointer tpi of each section si are stored in a circular memory 11 (shown on FIG. 1). For example, a realistic buffer system may limit the maximal number of queued packets to 512 maximum-size packets per flow. Then, supposing that the section load threshold equals the maximum packet size, a sufficient section memory has the addresses 1 to 512. At the given instant shown on FIGS. 1 and 2, the active sections occupy the address interval 23, 24, . . . , 27. All other sections have NULL entries in the head and tail pointer columns. At a later time, the active sections, i.e. those with non-null head and tail pointers, may occupy address interval 510, 511, 512, 1, 2 and 3, meaning that a wrap-around may occur in the circular memory. In addition head pointer hpi and tail pointer tpi of a given section si may be dynamically updated each time a received packet is stored in, respectively extracted from, the given section si.

Furthermore, two particular pointers are associated with packet queue 10. One of these pointers is called forwarding pointer fp and points to the storage address of the first packet of the first—the oldest surviving—section currently storing at least one packet (i.e. forwarding pointer is equal to the head pointer of the first section currently storing at least one packet).

The second particular pointer, called dropping pointer dp, points to the storage address of the first packet of the last created section within packet queue 10 (i.e. forwarding pointer is equal to the head pointer of the last created section currently storing at least one packet).

As it will be explained in detail later on, forwarding pointer fp designates the packet stored in packet queue 10 which will be forwarded at first by router 100 when the egress available bandwidth is sufficient, and dropping pointer dp designates the head of a section from which a packet may be dropped when packet queue 10 is overloaded.

As shown on FIG. 3a, forwarding pointer fp points to the storage address of the first packet of section s23, and dropping pointer dp points to the storage address of the first packet of section s27. Advantageously, these two particular pointers may be stored in a specific memory 14 of router 100 and updated each time a received packet is stored in, respectively extracted from, packet queue 10.

The following examples are intended to illustrate various cases of insertion of packets of a given flow in the packet queue according to the given flow and the section load threshold allocated for this flow. For the purpose of illustrating the dynamical aspect of the creation, updating or deletion of a section si and the insertion of a received packet in packet queue 10, two representations of packet queue 10 are shown on FIGS. 3a and 3b. These two figures represent state of packet queue 10 at two different times. It is assumed that the initial situation of packet queue 10 is the situation represented on FIG. 3a.

Figure 3B:
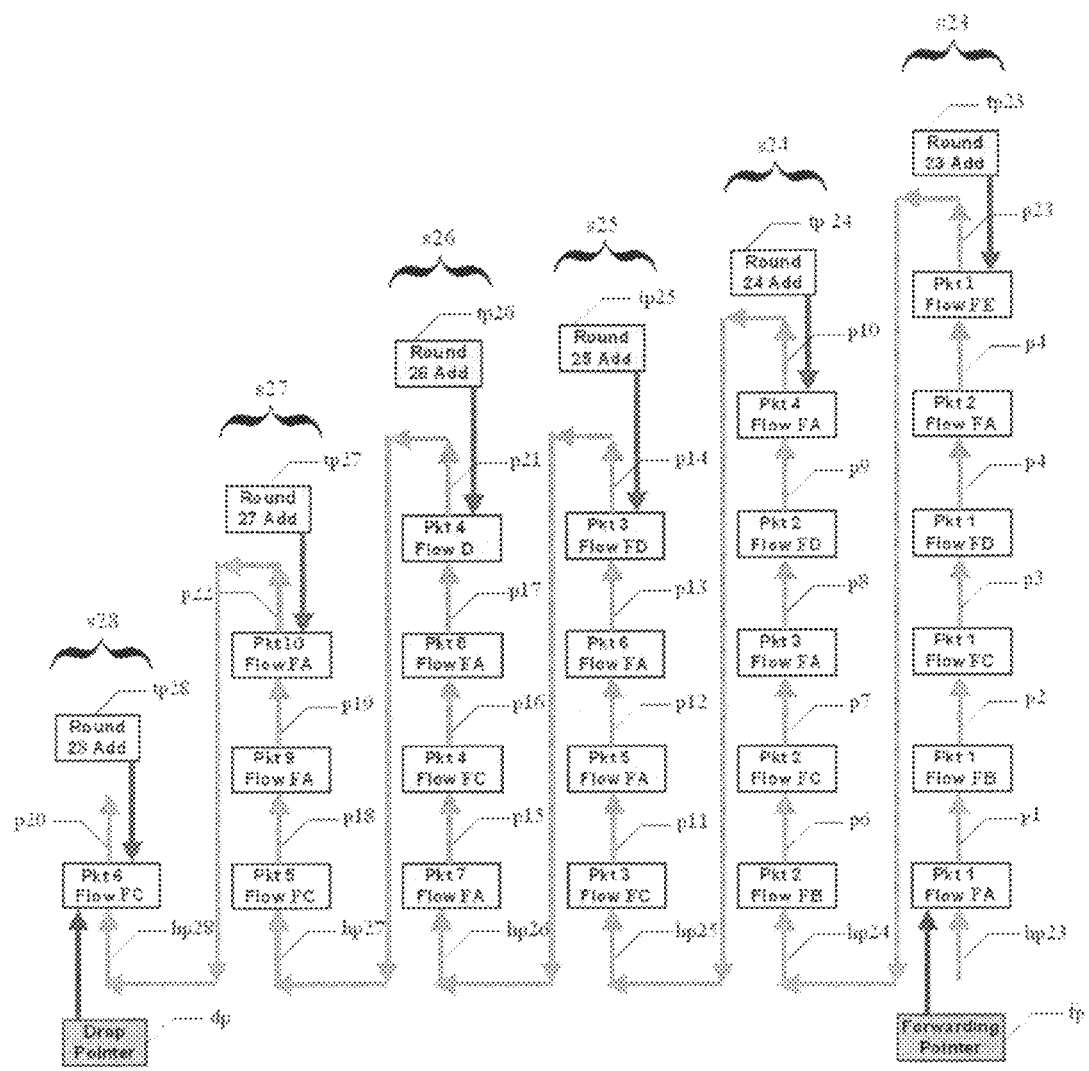

The following examples will describe how, after the successive reception of packets of different given flows, the state of packet queue 10 will moves from the state represented on FIG. 3a to the state represented of FIG. 3b.

As represented on FIG. 3a, packet queue 10 is divided into 5 sections respectively numbered section s23, s24, s25, s26 and s27. The first section and the last section currently storing a packet are respectively section s23 and section s27. The first packet to be extracted (the first packet of the global chained list) is the packet of flow FA numbered Pkt 1. The first packet to be dropped in case of overflow is the packet of flow FC numbered pkt 5.

Firstly, it is assumed that a packet of flow FC is received at router 100 (Step S0 on FIG. 3). According to the method, it is checked whether packet queue is empty (Step S1 on FIG. 3). Since packet queue 10, as shown on FIG. 3a, currently stores packets, the method checks whether an existing section already stores the last received packet of flow FC (step S2 on FIG. 3). Such verification may be performed through the use of memory 12 (shown on FIG. 1) which stores the section identifier of the section si storing the last packet of a given flow. As shown on FIG. 1, a convenient implementation of the decision process uses a table 12, which stores in column 2 the last used section as a function of the flow FX, and stores the special value −1 if no such section holds a packet of the flow.

In the current situation, table 12 indicates that section s27 is currently storing the packet of flow FC numbered Pkt 5. This packet corresponds to the last received packet of flow FC stored in packet queue 10.

Then, it is checked whether the amount of data stored in section s27 for flow FC is less than the section load threshold allocated to flow FC. The different section load thresholds allocated to each flow are preferably stored in a routing table 13 (shown on FIG. 1) currently used in the router. It is to be noticed that the wording "section load threshold" is used for a better illustration of the invention and is equivalent to the wording "weight" commonly used when describing currently used weights in fair queuing method which have previously been discussed.

Thus, when implementing the correspondence necessary to correctly perform the routing of a given flow, information concerning an amount of data authorized to be stored per section may also be indicated in routing table 13 for this flow.

Advantageously, the section load threshold may correspond to a maximum amount of bytes authorized to be stored in a section. In this case, the method according to the invention determines the size of all the packets belonging to same flow as the received packet and sums up all the determined size and the size of the received packet. If the calculated size is less than section load threshold, the received packet is stored in the existing section (step S210 on FIG. 3).

In this case when table 13 contains load thresholds in bytes, column 3 of table 12 also counts the bytes of data of flow FX which are already used in the last section. When this count of bytes, plus the size of the received packet of flow FX, exceeds the load threshold of table 13, the packet is stored in the immediately following section (which already exists or which is created as it will be illustrated later on), and the count of bytes corresponding to this new section—column 3 of table 12—is initialized with the amount of excess (the "carryover"). This accounting method implements a fair bandwidth sharing, such that the ratio of throughput between flows is precisely equal to the ratio of their section load thresholds.

Alternatively, the section load threshold may correspond to a maximum number of packets that can be stored per section. In this case, the method determines if the number of packets already stored in the existing section is strictly inferior to the section load threshold.

In addition, the section load threshold can be dynamically updated according to a global load threshold, wherein said global load threshold is a function of the amount of data currently stored in said packet queue for the given flow. The global load threshold corresponds to a strategic target weight of flows or aggregates which can be set or determined based on a slow traffic observation algorithm. For instance, a useful fairness strategy may want to favor the flows that are the least bursty and have a modest rate, such as streaming videos. Then the section load threshold can be set high (for instance, five maximal packet sizes) while a given flow is already present only in one or two sections in said packet queue 10, and can progressively be decreased, down to one maximal packet size when the flow is present in more than five sections, because of a burst or an aggressive increase of its arrival rate. To limit unstable router behavior, such a "punished" flow regains a higher load threshold only after it has been entirely emptied from the packet queue.

In the present example, it is further assumed that routing table 13 indicates that the maximum number of packets authorized to be stored per section for flow FC is one. Consequently, since section S27 already stores one packet of flow FC, it is not possible to store the current received packet in section s27.

In this case, it is then checked if section S27 is the last created section within packet queue 10 (step S220 on FIG. 3).

As shown on FIG. 23a, section s27 is the last created section. Therefore, a new section s28 (shown on FIG. 3b) is created. The new created section s28 immediately follows section s27. More precisely, a new entry is created in circular memory 11 with the section identifier 28.

In addition, value of pointer p19 associated to the last packet stored in section s27 is updated to indicate the address where the new received packet is stored in packet queue 10. The new value of pointer p19 is then assigned to head pointer hp28 of new created section s28.

Since section s28 only stores one packet, tail pointer tp28 also points to the storage address where the new received packet of flow FC (numbered Pkt 6) is stored. Furthermore, for the reasons already explained above, pointer p20 associated to the new received packet is equal to the NULL pointer.

Additionally, since a new section has been created, dropping pointer dp is updated. The new value of dropping pointer is the value of head pointer hp28 of the new created section s28.

In a second time, it is assumed that a packet of flow FD is received at router 100. It is further assumed that the maximum number of packets than can be stored per section for flow FD is one. According to the state diagram shown on FIG. 3, steps S1, S2, S21 and S20 are successively performed and return the following results:

step S1 determines that packet queue is not empty;

step S2 determines that existing section s25 currently stores the last received packet of flow FD;

step 21 determines that the new received packet of flow D cannot be stored in existing section S25 since the section load threshold of flow FD has already been reached;

Step 220 determines that section s25 is not the last created section within packet queue 10;

Consequently, the new received packet of flow FD (numbered Pkt 4) is stored in section s26 which immediately follows section s25 (step 240 on FIG. 3). More precisely, the insertion of this new received packet induces the following actions:

The new received packet is stored in packet queue 10 at a storage address.

Tail pointer tp26 of section s26 is retrieved from circular memory 11. Thanks to tail pointer tp26, the last packet of section s26 (packet of flow FA numbered Pkt 8) is addressed and the value of pointer p17 associated with this packet is updated. Pointer p17 which formerly (i.e. before new received packet of flow FD has been stored) pointed to the storage address of the first packet of section s27, is updated and now points to the storage address of new received packet of flow FD.

Since the new received packet has been added to section s26, tail pointer tp26 which formerly pointed to the storage address of packet of flow FA numbered Pkt 8 is updated; After insertion of new received packet, tail pointer tp26 points to the storage address of new received packet of flow FD.

Since section s26 is not the last created section within packet queue 10 and since the new received packet of flow FD is presently the last packet of section s26, pointer p21 associated to the new received packet is equal to head pointer hp27 of the immediately successive section s27 within packet queue 10. Consequently, pointer p21 indicates the storage address of packet of flow FC numbered Pkt 5 which is the first packet of section s27.

After the reception of packet of flow FD numbered Pkt 4, it is assumed that a packet of flow FA (numbered Pkt 10) is received at router 100. It is further assumed that the maximum number of packets authorized to be stored per section for flow FA, i.e. the section load threshold, is two. According to the state diagram shown on FIG. 3, steps S1, S2, S21 are successively performed and return the following results:

step S1 determines that packet queue 10 is not empty;

step S2 determines that existing section s27 currently stores the last received packet of flow FA;

step 21 determines that the section load threshold of flow FA has not been reached yet;

Consequently, the new received packet of flow FA is stored in existing section s27 (step S210 on FIG. 3). More precisely, the insertion of this new received packet induces the following actions:

The new received packet is stored in packet queue 10 at a storage address.

Tail pointer tp27 is retrieved from circular memory 11. Thanks to tail pointer tp27, the packet of flow FA numbered Pkt 9 is addressed and the value of pointer p19 associated with this packet is updated. Pointer p19 which formerly (i.e. before new received packet of flow FA has been stored) pointed to the storage address of the first packet of section s28, now points to the storage address of new received packet of flow FA.

Since the new received packet has been added to section s27, tail pointer tp27 which formerly pointed to the storage address of packet of flow FA numbered Pkt 9 is updated. After insertion of the new received packet, tail pointer tp27 points to the storage address of the new received packet of flow FA.

Since section s27 is not the last created section within packet queue 10 and since the new received packet is now the last packet of section s27, pointer p22 associated to the new received packet is equal to head pointer hp28. Consequently, pointer p22 indicates the storage address of packet of flow FD (the reception of which has been disclosed in the first example) which is the first packet of section s28.

Finally, it is assumed that a packet of flow FE (numbered Pkt 1) is received at router 100. It is further assumed that the maximum number of packets authorized to be stored per section for flow FE is three. According to the state diagram shown on FIG. 3, steps S1, S2 are successively performed and return the following results:

step S1 determines that packet queue 10 is not empty;

step S2 determines that no existing section currently stores a packet belonging to flow FE. It is to be noticed that the fact that no packet of flow E is currently stored in packet queue 10 does not necessary mean that the new received packet is the first packet of flow FE which has been received at router 100. Indeed, it is possible that packets of flow FE previously received, have already been extracted from packet queue 10.

Consequently, the new received packet of flow FE is stored in section s23 which is the first section currently storing at least one packet (step S22) on FIG. 3).

For the reasons already explained above:

tail pointer tp23 of section s23 and pointer p5 are updated; and pointer p24 associated with the new received packet is instantiated with the current value of head pointer of section s24.

The result of the insertion of the packets successively received in the four examples described above is represented on FIG. 3a.

As represented on FIG. 3b, packet queue 10 is now divided into 6 sections respectively numbered section s23, s24, s25, s26, s27 and s28. The first section and the last section currently storing a packet are respectively section s23 and section s28. The four packets received have been inserted in packet queue 10 and are now links of the global chained list. The first packet to be extracted (the first packet of the global chained list) is still the packet of flow FA numbered Pkt 1. The first packet to be dropped in case of overflow is now the packet of flow FC numbered pkt 6.

In the following example, it is assumed that packet queue is empty when a packet arrives at router 100. Although no figure explicitly illustrates this case, the creation of a first section (step S10 on FIG. 2) and the storage of the received packet in the first section (step S11 on FIG. 2) induce:

The new received packet is stored in packet queue 10 at a storage address.

A new entry is created in circular memory 11 with the section identifier 1.

Tail pointer tp1 and head pointer hp1 of section s1 are created and both points to the storage address of the new received packet.

Forwarding pointer fp and dropping pointer dp are created and both point to the storage address of the single new received packet.

The chain pointer associated to the received packet is equal to the NULL pointer.

According to the previously quoted examples, wording "immediately successive section" and "ordered section" are used in the sense that all the created sections within packet queue 10 define a global chained list. More precisely, each given section si consists in a chained list having a head pointer hpi and a tail pointer tpi. Each section si is indirectly linked to the immediately successive section within packet queue 10, if existing, through the use of its head or its tail pointers. When successive sections si are currently storing at least one packet, a global chained list is defined by these sections si and the relation that exists between them. Each stored packet is a link of the global chained list.

Consequently, starting from the storage address currently indicated by the forwarding pointer fp, it is possible to find the storage address of all the packets currently stored in packet queue 10 in a sequential manner.

As shown on FIG. 3b, forwarding pointer fp indicates the storage address of the first packet (packet of flow A numbered Pkt1) of section s23 which is the first section within packet queue 10 that currently comprises at least one packet. Thanks to forwarding pointer fp, which equals hp23, the packet of flow A numbered Pkt1 is retrieved as soon as the router output port is available. Then thanks to pointer p1 associated to this packet, which is copied to forwarding pointer fp, packet of flow B numbered Pkt1 is retrieved. The last packet retrieved corresponds to the packet of flow C numbered Pkt6 the associated pointer p10 of which is equal to the NULL pointer. This packet is the last packet of section 28 which is the last created section within packet queue 10.

Similarly, starting from the storage address indicated by tail pointer tpi of section si, the last packet of section si and all the packets of all the successive sections si+1, si+2, ..., si+n, if they exist, may be retrieved. Same kind of sequentially retrieving may be performed starting from the storage address indicated by a head pointer hpi of section si.

At a given time, the extraction of packets stored in packet queue 10 is performed sequentially starting from the current forwarding pointer.

Figure 4:
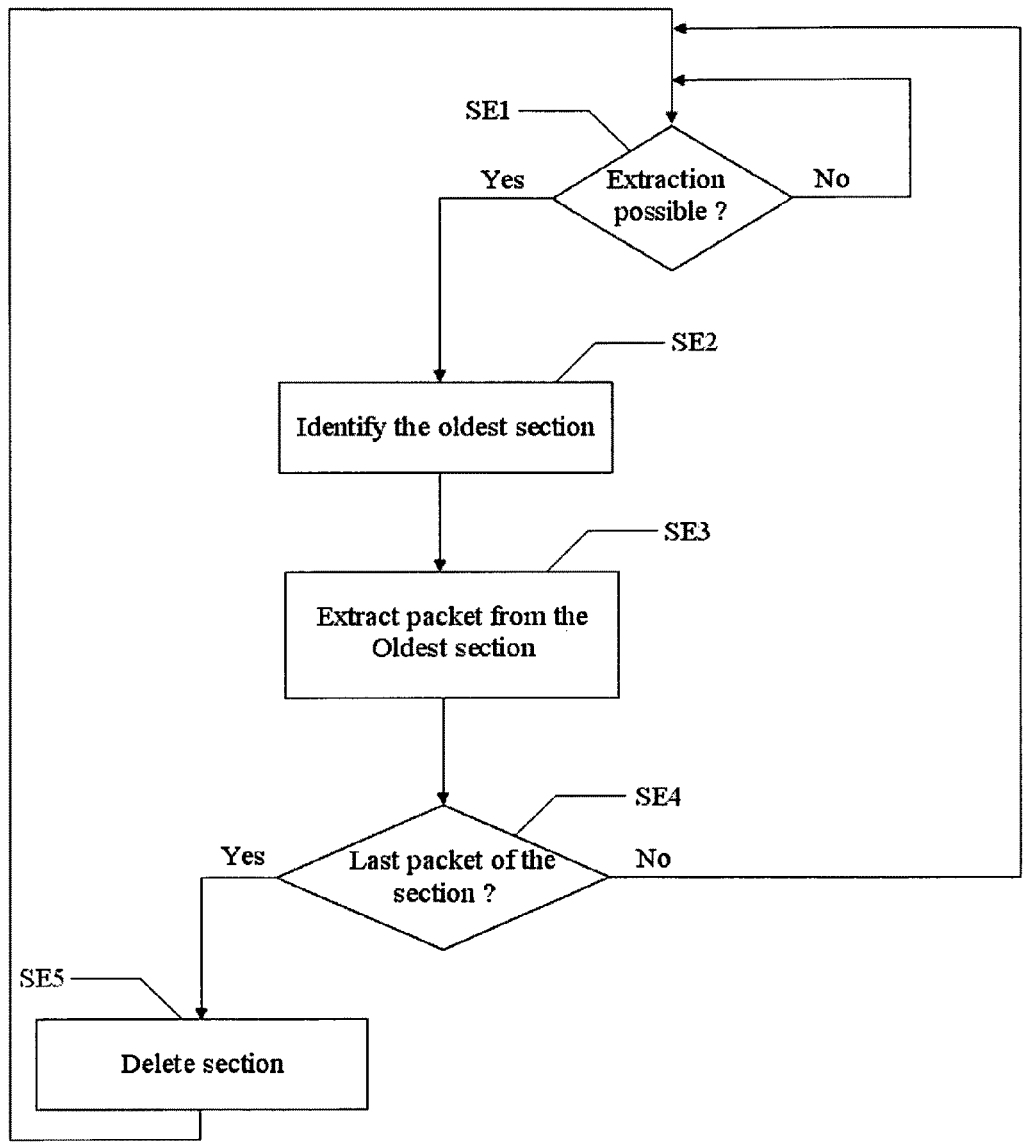
FIG. 4 shows a schematic diagram representing the different steps of the method according to a preferred embodiment of the invention for extracting the next packet to be forwarded from the single packet queue.

Referring to FIGS. 1, 3b and 4, the various steps implemented for extracting a stored packet and deleting a section will be now detailed.

As shown in FIG. 4, it is first checked, according to the method of the invention, whether it is possible to forward a packet from router 100 (Step SE1 on FIG. 4). Advantageously, transmission bandwidth at the egress side of router 100 is estimated.

When sufficient bandwidth is available to transmit a packet, the section having the smallest identifier is identified (Step SE2 on FIG. 4). More precisely, such identification may be performed by using forwarding pointer fp currently stored in memory 14. Indeed, as already mentioned above, forwarding pointer fp is equal to the head pointer of the first section within packet queue 10 currently storing at least one packet.

Once the section having the smallest identifier has been identified, the first packet of this section is extracted and forwarded (Step SE3 on FIG. 4). More precisely, packet to be extracted is retrieved through the use of the storage address indicated by forwarding pointer fp.

As shown on FIG. 3b, forwarding pointer fp designates the storage address of the first packet of section s23. Retrieved packet of flow A numbered Pkt 1 is then extracted and forwarded on egress side of router 100. In addition, forwarding pointer fp and head of pointer hp23 are updated in order to points to the storage address previously indicated by pointer p1. Thanks to this updating, the next packet to be extracted is clearly identified.

After having extracted a packet, it is checked whether the extracted packet is the last packet of the section (Step SE4 on FIG. 4). One of the solutions to check if all the packets of the section si have been extracted is to compare the value of forwarding pointer fp just before performing the extraction with the value of tail pointer tpi of section si.

For instance, according to FIG. 3b, while the value of forwarding pointer fp is different from tail pointer tp23 of section 23, at least one remaining packet is stored in section s23.

Conversely, the fact that forwarding pointer fp is equal to tail pointer tp23 induces that the extracted packet is the packet of flow FE numbered Pkt1 which is the last packet of section s23.

When all packets of section s23 have been extracted, section s23 is deleted (Step SE5 on FIG. 4). Consequently, tail pointer tp23 and head pointer hp23 are cancelled from circular memory 11, typically by setting their values to NULL. Section s24 then becomes the section having the smallest identifier and the next packet to be extracted will be the first packet stored in this section.

It should be noted that until all packets of section s23 have not been extracted, it is possible to insert a new received packet in section s23. For instance, assuming that packet of flow FA numbered Pkt1 has been extracted and that a new packet of flow FF is received at router. This flow FF has no packet stored in the queue 10, as can be read from column 2, Table 12, FIG. 1 that contains value −1. According to the above quoted explanations, new received packet is inserted next to packet of flow FE numbered Pkt1.

On the contrary, if a new packet of flow FA (packet numbered Pkt 11) is received, this new received packet is not allowed, according to the invention, to be stored in section s23. Indeed, the new packet is stored in the existing section where the last received packet of Flow FA is currently stored or in a newly created section that immediately follows the existing section. Consequently, the arrival order of the different packets of a specific flow is maintained in the global chained list. Furthermore, since packets are extracted sequentially and the arrival order is maintained in the global chained list, same order (for the specific flow) still exists at the egress side of router 100 when the packets are forwarded.

In addition, as previously described, according to the method of the invention, a new received packet belonging to a flow already present in packet queue 10 may be stored as the last link of the chained list (Packet of flow FC numbered Pkt 6).

On the contrary, as previously disclosed, according to the method of the invention, a new received packet (Packet of flow FE numbered Pkt 1) belonging to a flow which is not present in packet queue is stored in the first section (i.e. in the first links of the chained list). Then this packet will be forwarded before packets of other flows FA, FB, FC and FD stored in successive sections although the latter have been previously received at router 100.

Consequently, the received packet of flow FE will not be buffered within router 100 until all the packets of other more represented flows FA, FB, FC and FD are forwarded. The fact that packet of a given flow FE, once stored has as much chance to get extracted as compared to packets of other flows FA, FB, FC, FD shows that the method according to the invention insures a fair scheduling. In particular, the service rates of different enqueued flows are proportional to the section load thresholds of those flows, enabling the router to implement any policy of weighted fairness.

Furthermore, contrary to DRR method, "burstification" at the egress side of router 100 is avoided according to the use of a single packet queue for storing all the packets of all the different flows in combination with the use of sections of variable size and a section load threshold for each flow.

In addition, it may be useful, in case the multiplexed packet stream incoming at router 100 presents "burst" events which are runs of successive packets belonging to the same flow, to avoid these disturbing events being forwarded at the egress side of router 100.

Burst removal is enabled thanks to the combination of:
the possibility to define small section load thresholds, typically an average packet size, for any given flow;
the possibility to create a new section when the section load threshold is already reached for an existing section (step S221 on FIG. 3), as it is disclosed in above mentioned example 1; and
the possibility of storing a received packet in a section which is not the last created section within packet queue 10, as it is disclosed in above mentioned examples 2 and 4;

Indeed, assuming that multiplexed packet stream 1 comprises a sequence of 300 packets of flow FA and that section load threshold for flow FA is two packets per section. Then, when the sequence is received at router 100, 150 successive sections are created. Each section stores two successive packets of the sequence.

However, according to the invention, these 150 successive sections will be adapted to store packets belonging to other flows received after the sequence of packets of flow FA. More precisely, packets of different flows will be inserted, in the global chained list, between the packets of flow A. In particular, the first section will comprise the two packets of flow FA following by a plurality of packets of other flows.

Consequently, the forwarded multiplexed packet stream formed from the sequentially extracted packets will not have a long sequence of packet of flow FA and will present, on contrary, a uniform distribution of packets of different flows.

In addition, if the circular memory 11 is adapted to store at least a number of N entries, packet queue 10 is only adapted to be divided into a maximum of N sections. In this case, a received packet of a given flow is preferably dropped without being inserted into single packet queue 10 if the number of sections which are currently storing at least one packet is equal to N and if the last section created within said packet queue 10 stores an amount of data for said given flow greater or equal to the section load threshold of this flow.

Advantageously, in order to avoid that packet queue 10 be overloaded with packets of flows which are excessively present (i.e, the incoming throughput of which is far greater than incoming throughput of other flows), the method according to the invention is adapted to drop a number of packets stored in the last section created within packet queue 10. Compared to a non-selective drop-tail strategy of conventional routers, which unfairly drop packets belonging to low-rate flows, the selective drop method according to the invention preserves the flows that stay below the fair arrival rate. The method only hits packets belonging to the flows with overrate or with large bursts of arrival.

Figure 5:
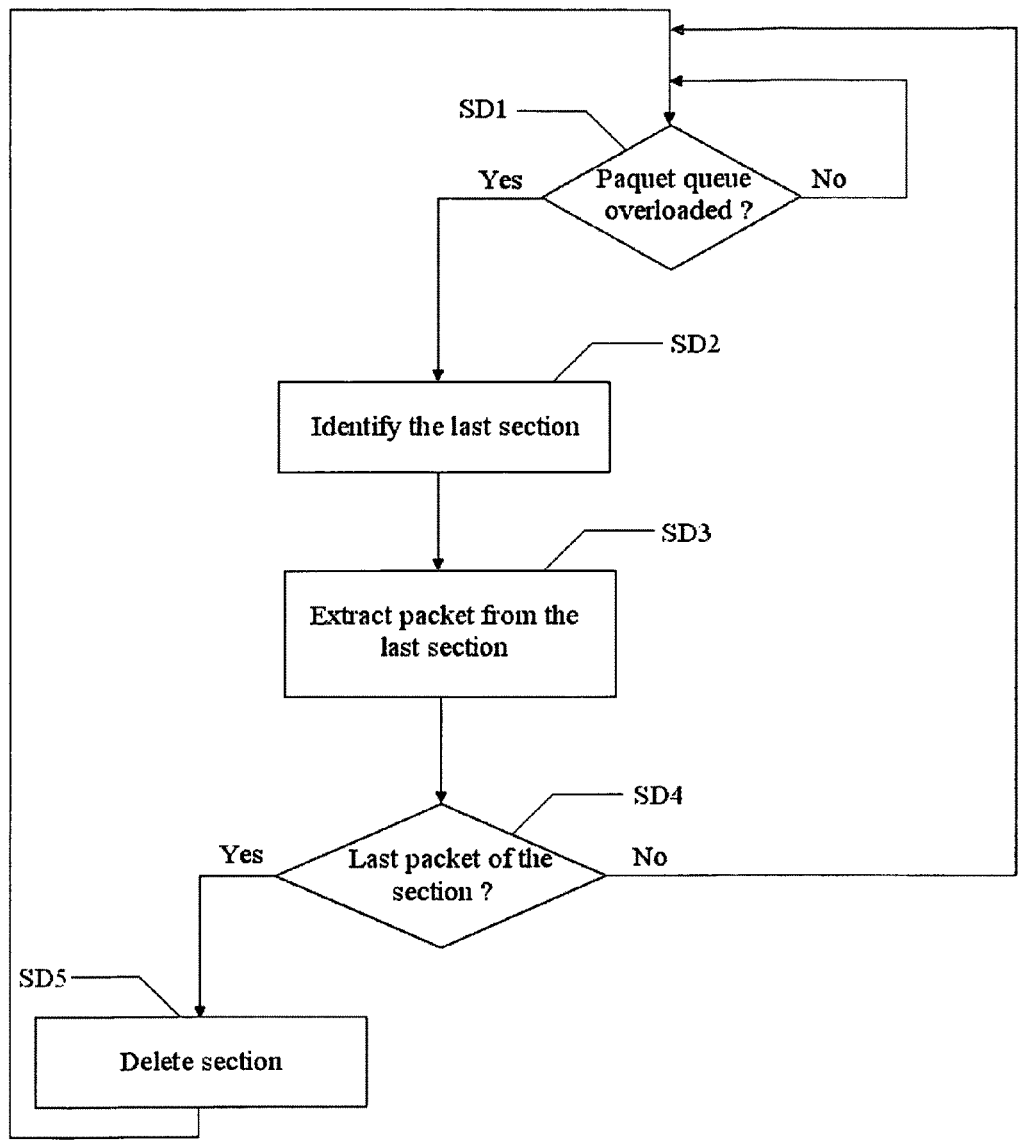
FIG. 5 shows a schematic diagram representing the different steps of the method according to a preferred embodiment the invention for selectively dropping a packet having a long expected delay from the single packet queue.

Referring to FIGS. 1, 3*b* and 5, the various steps implemented for dropping a stored packet will be detailed.

As shown in FIG. 5, it is first checked, according to the method of the invention, whether an amount of data stored in packet queue 10 is greater than a packet queue load threshold (Step SD1 on FIG. 5).

When the amount of data stored in greater than the packet queue load threshold, the last section created within packet queue 10 is identified (Step SD2 on FIG. 5). More precisely, such identification may be performed by using dropping pointer dp currently stored in memory 14. Indeed, as already mentioned above, dropping pointer dp is equal to the head pointer of the last created section within packet queue 10.

Once the last section created within packet queue has been identified, first packet of this section is dropped (Step SD3 on FIG. 5). More precisely, the packet to be dropped is retrieved through the use of the storage address indicated by dropping pointer dp.

As shown on FIG. 3*b*, dropping pointer dp designates the storage address of the first packet of section s28. Retrieved packet of flow C numbered Pkt 6 is then dropped. In addition, dropping pointer dp and head of pointer hp28, as well as the chain pointer p22 from the preceding packet that is addressed with the tail pointer tp27, are updated to point to the storage address previously indicated by pointer p20. Thanks to this updating, the next packet to be dropped is clearly identified.

After having dropped a packet, it is checked whether the dropped packet is the last packet of the section (Step SD4 on FIG. 5). One of the solutions to check whether all the packets of the section si have been dropped is to compare the value of dropping pointer dp just before performing the dropping with the value of tail pointer tpi of section si.

For instance, according to FIG. 3*b*, while the value of dropping pointer dp is different from tail pointer tp28 of section 28, at least one remaining packet is stored in section s28.

On the contrary, the fact that dropping pointer dp is equal to tail pointer tp28 induces that the dropped packet is the packet of flow FC numbered Pkt6 which is the last packet of section s28.

When all packet of section s28 have been dropped, section s28 is deleted (Step SD5 on FIG. 5). Consequently, tail pointer tp28 and head pointer hp28 are cancelled from circular memory 11. Section s27 then becomes the last section created within packet queue 10 and the next packet to be dropped will be the first packet stored in this section.

It should be noted that until all packet of section s28 have not been dropped, it is possible to insert a new packet in section s28.

The invention claimed is:

1. A method for scheduling packets belonging to a plurality of packet flows received at a router, wherein in said method a single packet queue is used for storing said packets, said single packet queue being adapted to be divided into a variable number of successive sections, each section being of variable size and a section load threshold for each flow of said plurality of flows being allocated to each section, for each packet received from a given flow, the method comprising:
b1) checking whether said single packet queue has an existing section which already stores a last received packet belonging to said given flow;
b2) if no existing section has been identified at step b1), storing said received packet in a first section of said variable number of successive sections;
b3) if an existing section has been identified at step b1),
b31) either storing said received packet in said existing section if an amount of data currently stored in said existing section for said given flow is less than said corresponding section load threshold; or
b32) if said existing section is the last section created within said single packet queue, creating a new section which immediately follows said existing section, and storing said received packet in said new section;

b33) if said existing section is not the last section created within said single packet queue, storing said received packet in the section which immediately follows said existing section.

2. The method according to claim 1, wherein, for each packet received from the given flow, the method comprising:
if said single packet queue is empty, creating a first section and storing said
received packet in said first section.

3. The method as claimed in claim 2, further comprising:
identifying the last section created within said single packet queue;
dropping a number of packets stored in the last section created within said single packet queue; and
deleting said last section after all packets of said last section have been dropped.

4. The method as claimed in claim 3, wherein said step of dropping is performed when an amount of data stored in said single packet queue is greater than an overflow threshold.

5. The method as claimed in claim 3, wherein said step of identifying the last section is performed through the use of a dropping pointer which points to the storage address, in said single packet queue, of the first packet of said last section.

6. The method as claimed in claim 1, further comprising:
identifying a particular section among the successive sections which corresponds to the oldest section created within said single packet queue currently storing at least one packet; and
extracting sequentially a number of packets from said single packet queue, wherein the first packet extracted is the first packet stored in said particular section.

7. The method as claimed in claim 6, wherein said step of identifying a particular section consist in identifying the section having the smallest identifier among the successive sections which are currently storing at least one packet.

8. The method as claimed in claim 6, wherein said step of identifying a particular section is performed through the use of a forwarding pointer which points to the storage address, in said packet queue, of the first packet of said particular section.

9. The method as claimed in claim 6, further comprising deleting said particular section after all packets of said particular section have been extracted.

10. The method as claimed in claim 6, wherein the number of extracted packets is set as a function of a transmission bandwidth available at the egress side of said router.

11. The method as claimed in claim 6, wherein each successive section is identified through the use of a head pointer and a tail pointer which can be dynamically updated each time a received packet is stored in or extracted from said single packet queue.

12. The method as claimed in claim 11, wherein said head pointer and said tail pointer can be dynamically updated each time a received packet is deleted from said single packet queue.

13. The method as claimed in claim 1, wherein the successive sections are ordered according to a section identifier, and in that, a section identifier greater than the section identifier of said existing section is attached to said new section.

14. The method as claimed in claim 1, wherein, said single packet queue being adapted to be divided into a maximum number of sections, said received packet is deleted without being inserted into said single packet queue if the number of sections which are currently storing at least one packet is equal to the maximum number of sections and if the last section created within said packet queue already stores an amount of data for said given flow greater or equal to said section load threshold for said given flow.

15. The method as claimed in claim 1, wherein said section load threshold for said given flow can be dynamically updated according to a global load threshold, wherein said global load threshold is a function of the amount of data and of the number of sections currently stored in said packet queue for said given flow.

16. A router for scheduling packets belonging to a plurality of received packet flows, said packets being stored in a single packet queue divided into a variable number of successive sections, each section being of variable size and a section load threshold for each packet flow of said plurality of packet flows being allocated to each section, the router comprising:
a memory configured to
b1) check whether the single packet queue has an existing section that already stores a last received packet belonging to said given flow;
b2) store, if no existing section has been identified, said last received packet in a first section of said variable number of successive sections;
b3) if an existing section has been identified at step b1),
b31) one of store said received packet in said existing section if an amount of data currently stored in said existing section for said given flow is less than said corresponding section load threshold, and create, if said existing section is the last section created within said single packet queue, a new section which immediately follows said existing section, and storing said received packet in said new section;
b32) if said existing section is not the last section created within said single packet queue, store said received packet in the section which immediately follows said existing section.

* * * * *